US011778071B2

(12) United States Patent
Mamidwar et al.

(10) Patent No.: US 11,778,071 B2
(45) Date of Patent: Oct. 3, 2023

(54) SYSTEMS AND METHODS FOR CONVERTING BETWEEN A LOSSY COMMUNICATION PROTOCOL AND A LOSSLESS COMMUNICATION PROTOCOL

(71) Applicant: AVAGO TECHNOLOGIES INTERNATIONAL SALES PTE. LIMITED, Singapore (SG)

(72) Inventors: Rajesh Mamidwar, San Diego, CA (US); Anand Tongle, Richmond (CA); Sanjeev Sood, San Diego, CA (US); Florian Fainelli, Lake Forest, CA (US)

(73) Assignee: Avago Technologies International Sales Pte. Limited, Singapore (SG)

(*) Notice: Subject to any disclaimer, the term of this patent is extended or adjusted under 35 U.S.C. 154(b) by 1 day.

(21) Appl. No.: 17/159,087

(22) Filed: Jan. 26, 2021

(65) Prior Publication Data
US 2022/0239764 A1 Jul. 28, 2022

(51) Int. Cl.
H04L 69/08 (2022.01)
H04L 69/16 (2022.01)
H04L 1/1803 (2023.01)
H04L 47/36 (2022.01)
H04L 69/04 (2022.01)

(52) U.S. Cl.
CPC ............ H04L 69/08 (2013.01); H04L 1/1803 (2013.01); H04L 47/36 (2013.01); H04L 69/04 (2013.01); H04L 69/16 (2013.01)

(58) Field of Classification Search
CPC ....... H04L 69/08; H04L 1/1803; H04L 47/36; H04L 69/04; H04L 69/16
See application file for complete search history.

(56) References Cited

U.S. PATENT DOCUMENTS

| | | | |
|---|---|---|---|
| 9,021,134 B1* | 4/2015 | Patel | H04L 67/56 709/246 |
| 2006/0161679 A1* | 7/2006 | Ludvig | H04N 21/4516 709/224 |
| 2006/0227770 A1* | 10/2006 | Jakubik | H04L 61/2517 370/431 |
| 2011/0276712 A1* | 11/2011 | Narula | H04L 67/303 709/231 |
| 2012/0110203 A1* | 5/2012 | Ozawa | H04L 67/2823 709/231 |
| 2014/0067528 A1* | 3/2014 | Littlejohn | G06Q 30/02 705/14.49 |

(Continued)

FOREIGN PATENT DOCUMENTS

| | | | | |
|---|---|---|---|---|
| CN | 101076980 A | * | 11/2007 | ......... H04L 12/2854 |
| JP | 2009038536 A | * | 2/2009 | ............. H04L 63/20 |

Primary Examiner — Samina F Choudhry
(74) Attorney, Agent, or Firm — Foley & Lardner LLP

(57) ABSTRACT

Disclosed herein are related to communication systems and methods for converting between lossy communication protocol packets and lossless communication protocol packets. In one aspect, the communication system includes a server, a set top box, and an intermediate node. In some embodiments, the intermediate node is configured to receive a lossy communication protocol packet from the server, convert the lossy communication protocol packet to a lossless communication protocol packet, and transmit the converted lossless communication protocol packet to the set top box.

21 Claims, 7 Drawing Sheets

(56) References Cited

U.S. PATENT DOCUMENTS

| | | | | |
|---|---|---|---|---|
| 2014/0376387 A1* | 12/2014 | Shin | ............................ | H04L 1/08 |
| | | | | 370/245 |
| 2015/0288661 A1* | 10/2015 | Monk | .................... | H04L 63/101 |
| | | | | 726/12 |
| 2020/0314469 A1* | 10/2020 | Ryan | ..................... | H04N 21/242 |

* cited by examiner

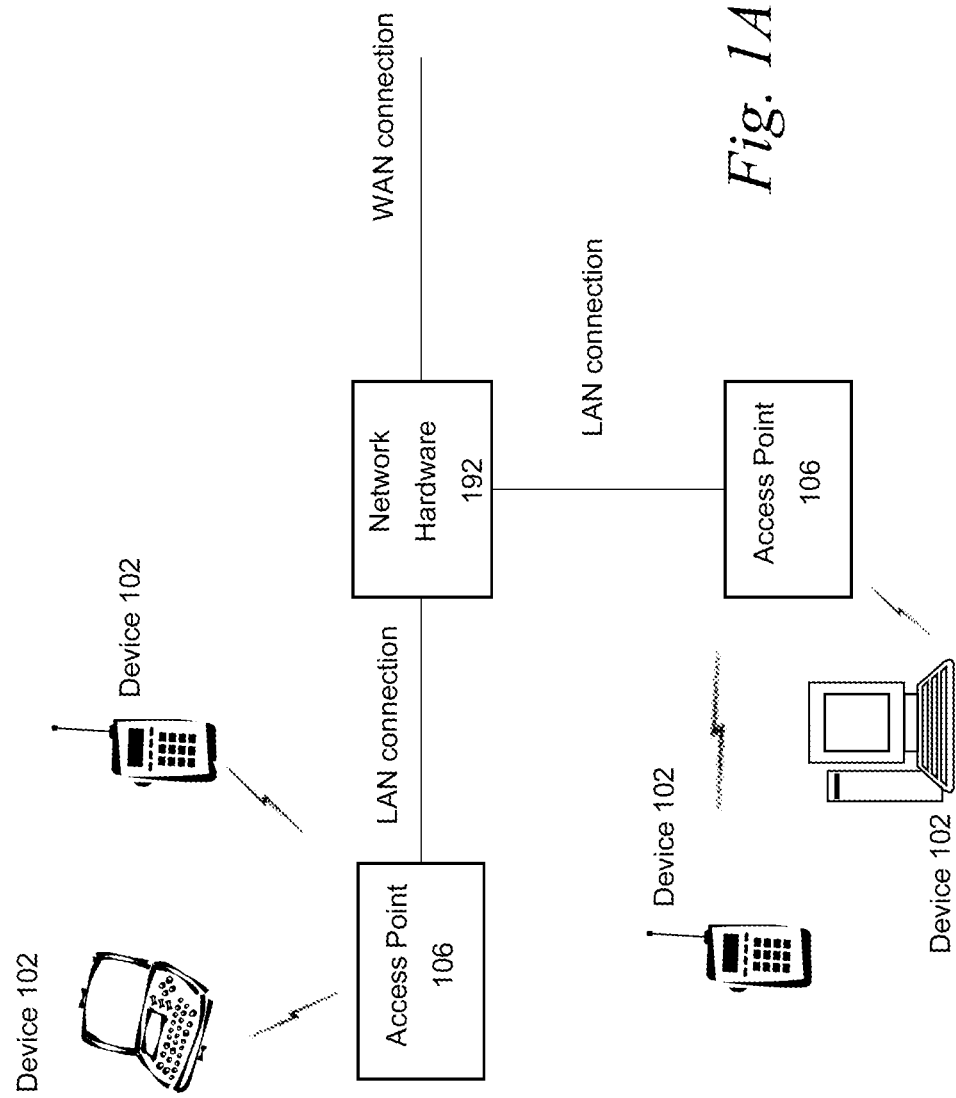

200
SYSTEMS AND METHODS FOR CONVERTING BETWEEN A LOSSY COMMUNICATION PROTOCOL AND A LOSSLESS COMMUNICATION PROTOCOL

FIELD OF THE DISCLOSURE

This disclosure generally relates to a communication system, including but not limited to combined use of lossy communication protocols and lossless communication protocols.

BACKGROUND OF THE DISCLOSURE

Lossless protocols, such as the transmission control protocol (TCP), may guarantee all data from a sender to a receiver. In such a protocol, in case of a packet loss on a network, the packet may be re-transmitted. While this adds reliability, lossless protocols frequently require additional overhead (for example, transmission of acknowledgements or negative acknowledgements; additional synchronization or retransmission identifiers; etc.) that may increase latency of communications. Lossy protocols, such as the user datagram protocol (UDP), may not be as reliable as lossless protocols, and packets dropped on a link may not be re-transmitted. However, due to the reduction in overhead, such protocols may frequently have lower latency, even over the same physical connections and routes.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 1A is a block diagram depicting a network environment including one or more access points in communication with one or more devices or stations, in one or more embodiments.

The details of various embodiments of the methods and systems are set forth in the accompanying drawings and the description below.

DETAILED DESCRIPTION

For purposes of reading the description of the various embodiments below, the following descriptions of the sections of the specification and their respective contents can be helpful:

Section A describes a network environment and computing environment which can be useful for practicing embodiments described herein; and Section B describes embodiments of systems and methods for converting between a lossy communication protocol and a lossless communication protocol.

A. Computing and Network Environment

Figure 1B:
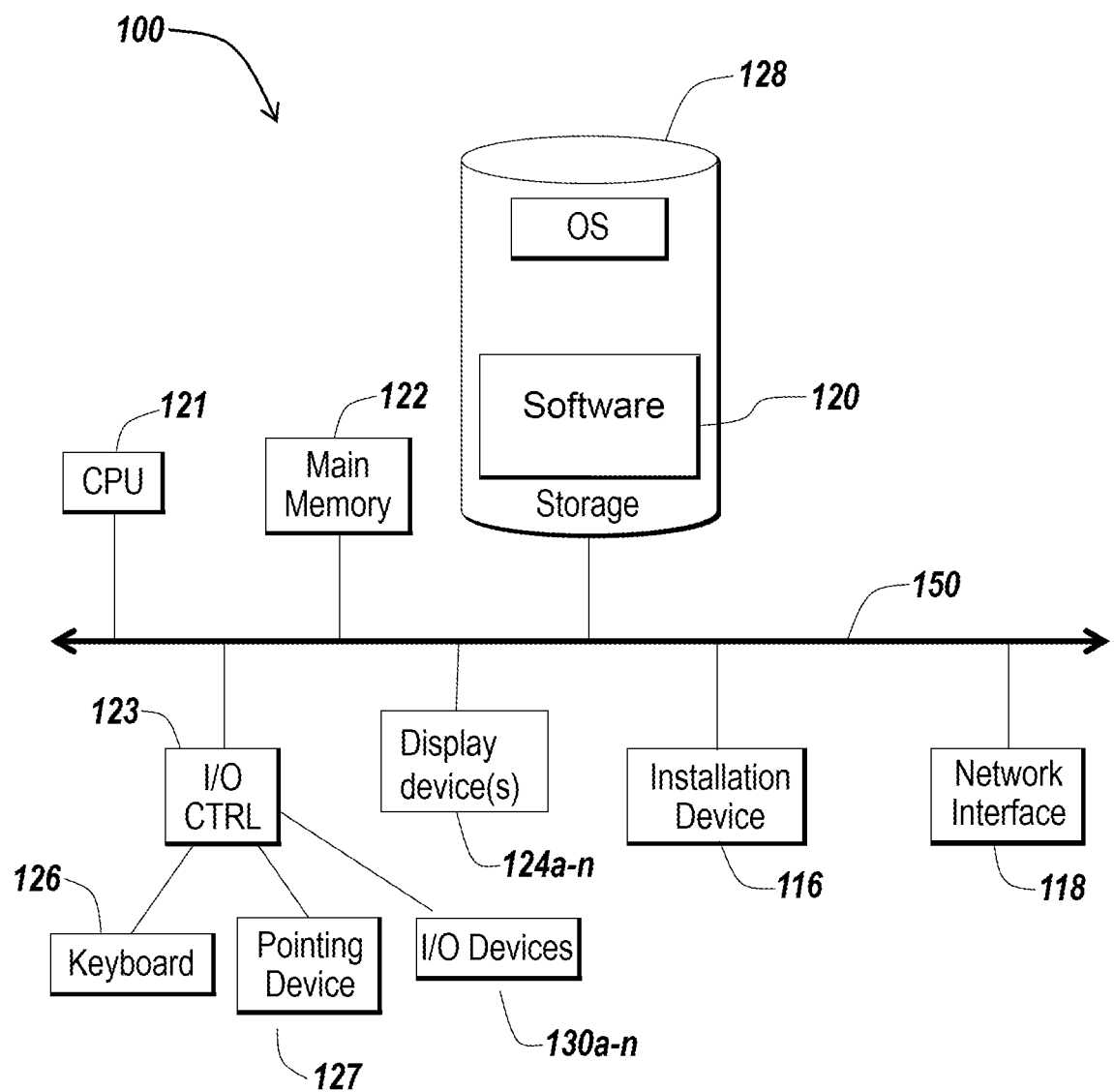
FIGS. 1B and 1C are block diagrams depicting computing devices useful in connection with the methods and systems described herein, in one or more embodiments.

Prior to discussing specific embodiments of the present solution, it can be helpful to describe aspects of the operating environment as well as associated system components (e.g., hardware elements) in connection with the methods and systems described herein. Referring to FIG. 1A, an embodiment of a network environment is depicted. In brief overview, the network environment includes a wireless communication system that includes one or more access points (APs) 106, one or more wireless communication devices 102 and a network hardware component 192. The wireless communication devices 102 can for example include laptop computers 102, tablets 102, personal computers 102, Internet of Things (IoT) devices 102, and/or cellular telephone devices 102. The details of an embodiment of each wireless communication device 102 and/or AP 106 are described in greater detail with reference to FIGS. 1B and 1C. The network environment can be an ad hoc network environment, an infrastructure wireless network environment, a subnet environment, etc. in one embodiment. The APs 106 can be operably coupled to the network hardware component 192 via local area network connections. The network hardware component 192, which can include a router, gateway, switch, bridge, modem, system controller, appliance, etc., can provide a local area network connection for the communication system. Each of the APs 106 can have an associated antenna or an antenna array to communicate with the wireless communication devices in its area. The wireless communication devices 102 can register with a particular AP 106 to receive services from the communication system (e.g., via a SU-MIMO or MU-MIMO configuration). For direct connections (e.g., point-to-point communications), some wireless communication devices can communicate directly via an allocated channel and communications protocol. Some of the wireless communication devices 102 can be mobile or relatively static with respect to AP 106.

In some embodiments an AP 106 includes a device or module (including a combination of hardware and software) that allows wireless communication devices 102 to connect to a wired network using wireless-fidelity (WiFi), or other standards. An AP 106 can sometimes be referred to as an wireless access point (WAP). An AP 106 can be implemented (e.g., configured, designed and/or built) for operating in a wireless local area network (WLAN). An AP 106 can connect to a router (e.g., via a wired network) as a standalone device in some embodiments. In other embodiments, an AP 106 can be a component of a router. An AP 106 can provide multiple devices access to a network. An AP 106 can, for example, connect to a wired Ethernet connection and provide wireless connections using radio frequency links for other devices 102 to utilize that wired connection. An AP 106 can be implemented to support a standard for sending and receiving data using one or more radio frequencies. Those standards, and the frequencies they use can be defined by the IEEE (e.g., IEEE 802.11 standards). An AP 106 can be configured and/or used to support public Internet hotspots, and/or on a network to extend the network's Wi-Fi signal range.

In some embodiments, the APs 106 can be used for (e.g., in-home or in-building) wireless networks (e.g., IEEE 802.11, Bluetooth, ZigBee, any other type of radio frequency based network protocol and/or variations thereof). Each of the wireless communication devices 102 can include a built-in radio and/or is coupled to a radio. Such wireless communication devices 102 and/or APs 106 can operate in accordance with the various aspects of the disclosure as presented herein to enhance performance, reduce costs and/or size, and/or enhance broadband applications. Each wireless communication device 102 can have the capacity to function as a client node seeking access to resources (e.g., data, and connection to networked nodes such as servers) via one or more APs 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1C:
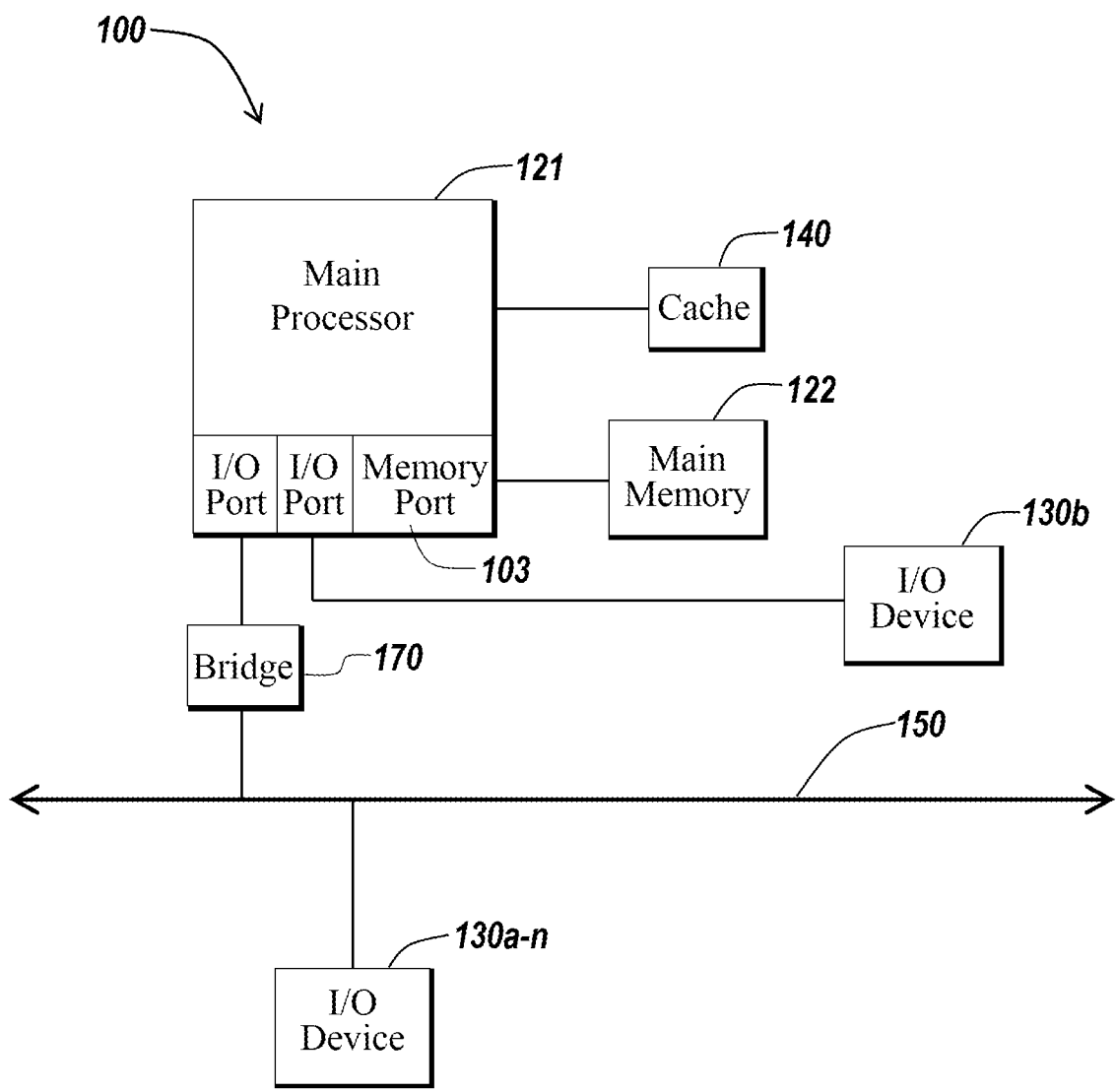

The communications device(s) 102 and access point(s) 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or AP 106. As shown in FIGS. 1B and 1C, each computing device 100 includes a central processing unit 121, and a main memory unit 122. As shown in FIG. 1B, a computing device 100 can include a storage device 128, an installation device 116, a network interface 118, an I/O controller 123, display devices 124a-124n, a keyboard 126 and a pointing device 127, such as a mouse. The storage device 128 can include an operating system and/or software. As shown in FIG. 1C, each computing device 100 can also include additional optional elements, such as a memory port 103, a bridge 170, one or more input/output devices 130a-130n, and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Santa Clara, Calif.; those manufactured by International Business Machines of White Plains, N.Y.; or those manufactured by Advanced Micro Devices of Sunnyvale, Calif. The computing device 100 can be based on any of these processors, or any other processor (e.g., integrated digital signal processor (DSP)) capable of operating as described herein.

Main memory unit 122 can be one or more memory chips capable of storing data and allowing any storage location to be directly accessed by the microprocessor or central processing unit 121, such as any type or variant of Static random access memory (SRAM), Dynamic random access memory (DRAM), Ferroelectric RAM (FRAM), NAND Flash, NOR Flash and Solid State Drives (SSD). The main memory unit 122 can be based on any of the above described memory chips, or any other available memory chips capable of operating as described herein. In the embodiment shown in FIG. 1B, the processor or central processing unit 121 communicates with main memory unit 122 via a system bus 150 (described in more detail below). FIG. 1C depicts an embodiment of a computing device 100 in which the processor communicates directly with main memory unit 122 via a memory port 103. For example, in FIG. 1C the main memory unit 122 can be DRDRAM.

FIG. 1C depicts an embodiment in which the main processor or central processing unit 121 communicates directly with cache memory 140 via a secondary bus, sometimes referred to as a backside bus. In other embodiments, the main processor or central processing unit 121 communicates with cache memory 140 using the system bus 150. Cache memory 140 typically has a faster response time than main memory unit 122 and is provided by, for example, SRAM, BSRAM, or EDRAM. In the embodiment shown in FIG. 1C, the processor or central processing unit 121 communicates with various I/O devices 130 via a local system bus 150. Various buses can be used to connect the central processing unit 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor or central processing unit 121 can use an Advanced Graphics Port (AGP) to communicate with the display 124. FIG. 1C depicts an embodiment of a computer device 100 in which the main processor or central processing unit 121 can communicate directly with I/O device 130b, for example via HYPERTRANSPORT, RAPIDIO, or INFINIBAND communications technology. FIG. 1C also depicts an embodiment in which local busses and direct communication are mixed: the processor or central processing unit 121 communicates with I/O device 130a using a local interconnect bus while communicating with I/O device 130b directly.

A wide variety of I/O devices 130a-130n can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium or installation device 116 for the computing device 100. In still other embodiments, the computing device 100 can provide USB connections (not shown) to receive handheld USB storage devices such as the USB Flash Drive line of devices manufactured by Twintech Industry, Inc. of Los Alamitos, Calif.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, IEEE 802.11ax, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124a-124n. As such, any of the I/O devices 130a-130n and/or the I/O controller 123 can include any type and/or form of suitable hardware, software, or combination of hardware and software to support, enable or provide for the connection and use of the display device(s) 124a-124n by the computing device 100. For example, the computing device 100 can include any type and/or form of video adapter, video card, driver, and/or library to interface, communicate, connect or otherwise use the display device(s) 124a-124n. In one embodiment, a video adapter can include multiple connectors to interface to the display device(s) 124a-124n. In other embodiments, the computing device 100 can include multiple video adapters, with each video adapter connected to the display device(s) 124a-124n. In some embodiments, any portion of the operating system of the computing device 100 can be configured for using multiple displays 124a-124n. In further embodiments, an I/O device 130 can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 100 of the sort depicted in FIGS. 1B and 1C can operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer device 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. In some embodiments, the computing device 100 can have different processors, operating systems, and input devices consistent with the device. For example, in one embodiment, the computing device 100 is a smart phone, mobile device, tablet or personal digital assistant. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. Converting Between a Lossy Communication Protocol and a Lossless Communication Protocol Various embodiments disclosed herein are related to converting packets between a lossy communication protocol and a lossless communication protocol for use in a combined communication system. In systems lacking the improved network implementations discussed herein, lossless protocol (e.g., transmission control protocol (TCP)) or lossy protocol (e.g., user datagram protocol (UDP)) connections are established between two devices, such as a set top box and a server, frequently traversing one or more intermediary devices (e.g., access points, routers, switches, firewalls, etc.). In such implementations, one or more cable, digital subscriber line (DSL) modems, switches, or WiFi access points (APs) deployed as intermediary devices can send data packets in each direction (e.g., from the set top box to the server, and from the server to the set top box). Additionally, in such implementations, connections between the intermediary device and each terminal device utilize the same transport layer protocol (e.g., the modem/switches/APs/other intermediary devices do not convert protocols between UDP and TCP for a same video or gaming connection). In some such implementations where low latency is particularly desired, e.g., for a gaming connection or video over internet protocol (VoIP) communication, to improve latency, lossy protocols may be utilized. To counteract the decrease in reliability, many users rely on more robust home networks (e.g., wired Ethernet). However, where such robust physical networks are unavailable, the reliability of the connection may be adversely affected.

Instead, the systems and methods described herein provide a combination or hybrid lossy and lossless protocol communication, with lossless protocols used for short-range communications (e.g., in a home or terminal location of the communication, where the distance between the terminal device and intermediary device may be a few dozen feet) via a less reliable physical medium (e.g. wireless), and lossy protocols used for long-range communications (e.g., across the Internet, with total distances of hundreds or even thousands of miles) via a more reliable physical medium (e.g., optical fiber, high bandwidth copper trunks, etc.). Described herein are implementations in which the intermediate node can convert lossy communication protocol packets to lossless communication protocol packets and vice-versa. For example, a terminal device such as a set top box can request a lossless communication protocol for a link between the intermediate node and the set top box (e.g., TCP over WiFi). The intermediate node can request a lossy communication protocol packet from the server (e.g., UDP over broadband or another wired connection to a wide area network). The intermediate node can convert lossy communication protocol packets received from the server to lossless communication protocol packets and transmit the lossless communication protocol packets to the set top box, and in some implementations, vice versa for return communications.

Advantageously, in case of a dropped packets, latency of a local retransmission from the intermediate node to the set top box (e.g., in a range of 2 msec to 5 msec) is less than a retransmission from the server to the set top box (e.g., greater than 100 msec). Thus, latency can be improved by avoiding retransmissions from the server, and reliability may be improved over lossy protocols by providing a lossless portion of the link between the intermediate node and terminal device. Locally dropped data can be re-transmitted from the intermediate node with minimal latency impact and a better experience.

Various embodiments disclosed herein are related to a communication system. In some embodiments, the system includes a server, a terminal device, and an intermediate node. In some embodiments, the intermediate node is configured to receive a lossy communication protocol packet from the server, convert the lossy communication protocol packet to a lossless communication protocol packet, and transmit the converted lossless communication protocol packet to the set top box. In some embodiments, the intermediate node is configured to remove a lossy communication protocol header from the lossy communication protocol packet to generate a payload. In some embodiments, the intermediate node is configured encapsulate the payload with a lossless communication protocol header to generate the lossless communication protocol packet. In some embodiments, the intermediate node 206 is configured to maintain a synchronization counter of the lossless communication protocol packet.

In some embodiments, the intermediate node is configured to convert the lossy communication protocol packet to the lossless communication protocol packet in response to determining that the server sends the lossy communication protocol packet and that the lossy communication protocol packet is destined for the set top box. In some embodiments, the intermediate node receives an acknowledgement for sending the lossless communication protocol packet from the set top box. In some embodiments, the intermediate node is configured to retransmit the lossless communication protocol packet to the set top box in response to not receiving an acknowledgement within a predetermined time period from the set top box.

In some embodiments, the intermediate node receives a control packet from the set top box. In some embodiments, the intermediate node transmits an acknowledgement to the set top box in response to receiving control packet from the set top box. In some embodiments, the intermediate node forwards the control packet to the server. In some embodiments, a moving picture export groups (MPEG) transport stream (TS) includes the lossy communication protocol packet.

Various embodiments disclosed herein are related to a method by an intermediate node of a communication system. In some embodiments, the method includes receiving a lossy communication protocol packet from a server, converting the lossy communication protocol packet to a lossless communication protocol packet, and transmitting the lossless communication protocol packet to a set top box. In some embodiments, the method includes removing a lossy communication protocol header from the lossy communication protocol packet to generate a payload. In some embodiments, the method includes encapsulating the payload with a lossless communication protocol header to generate the lossless communication protocol packet. In some embodiments, the method includes maintaining a synchronization counter of the lossless communication protocol packet.

In some embodiments, the method includes converting the lossy communication protocol packet to the lossless communication protocol packet in response to determining that the server sends the lossy communication protocol packet and that the lossy communication protocol packet is destined for the set top box. In some embodiments, the method includes receiving an acknowledgement for sending the lossless communication protocol packet from the set top box. In some embodiments, the method includes retransmitting the lossless communication protocol packet to the set top box in response to not receiving an acknowledgement within a predetermined time period from the set top box.

In some embodiments, the method includes receiving a control packet from the set top box. In some embodiments, the method includes transmitting an acknowledgement to the set top box in response to receiving control packet from the set top box. In some embodiments, the method includes forwarding the control packet to the server. In some embodiments, a moving picture export groups (MPEG) transport stream (TS) includes the lossy communication protocol packet.

Figure 2A:
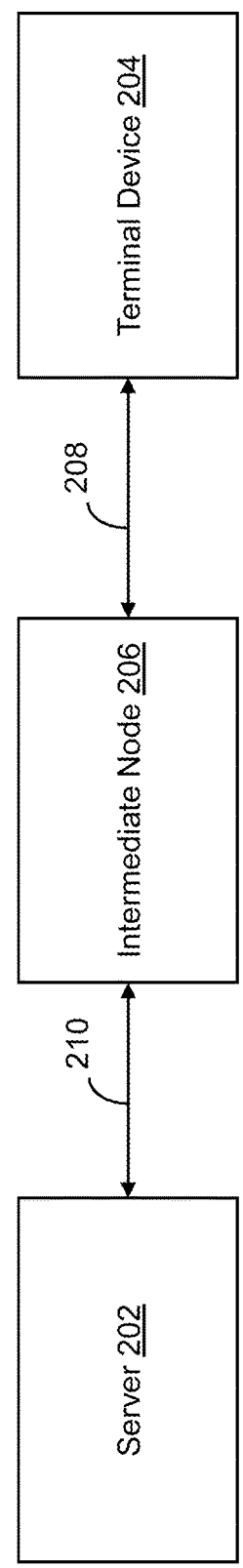
FIG. 2A is a block diagram depicting a communication system, in one or more embodiments.

Referring to FIG. 2A, illustrated is a block diagram depicting a communication system 200A, in one or more embodiments. The communication system 200A includes a server 202 (e.g., a cloud server, a remote server, a central server, application server, or other such computing device). In some embodiments, the server 202 is configured to transmit (e.g., send, provide) lossy communication protocol packets. In some embodiments, the lossy communication protocol packet is a user data protocol (UDP) packet or any other protocol not utilizing acknowledgements or retransmission protocols. Such protocols typically have very low latency and high throughput (e.g., due to decreased overhead) but are prone to dropped packets or errors. The server 202 can transmit the lossy communication protocol packet in response to receiving a request for the lossy communication protocol packet, such as for live video multicast and online gaming or any latency critical applications.

In some embodiments, the server 202 is configured to transmit lossless communication protocol packets. In some embodiments, the lossless communication protocol packet is a transmission control protocol (TCP) packet or any other protocol utilizing retransmissions or acknowledgements. Such protocols can address packet losses and provide high reliability, at the cost of some throughput and latency (e.g., due to increased overhead). The server 202 can transmit the lossless communication protocol packet in response to receiving a request for the lossless communication protocol packet, such as for web services, online shopping, paid streaming services, or any application that is to provide/display high video quality and where latency is less important.

The communication system 200A includes a terminal device 204 (e.g., set top box, player, device, mobile device, station, user equipment, the device 102). In some embodiments, the terminal device 204 is configured to request one or more of a lossy communication protocol connection or a lossless communication protocol connection. In some embodiments, the terminal device 204 is configured to receive and decode one or more of lossy communication protocol packets or lossless communication protocol packets.

The communication system 200A includes an intermediary device or intermediate node 206 (e.g., a modem, a cable modem, a DSL modem, a switch, a WiFi access point, the access point 106, pico cell, etc.) in communication with the server 202 and the terminal device 204. In some embodiments, the terminal device 204 establishes communication (e.g., a link) with the intermediate node 206. In some embodiments, the link between the terminal device 204 and the intermediate node 206 is a lossless communication protocol link. In some embodiments, the communication between the terminal device 204 and the intermediate node 206 is through a network (e.g., communication channel) 208. The network 208 may be one or more of a local area network (LAN), a home network, Ethernet over power line, MoCA, IEEE 802.11 (e.g., WiFi), Bluetooth, ZigBee, 5G, etc.

In some embodiments, the intermediate node 206 establishes communication with the server 202. In some embodiments, the link between the server 202 and the intermediate node 206 is a lossy communication protocol link. In some embodiments, the communication between the intermediate node 206 and the server 202 is through another network (e.g., communication channel) 210. The network 210 may be one or more of a wide area network (WAN), a LAN, a network via cable/DSL/satellite/fiber optics, a cellular network, 5G, 4G, etc.

In some embodiments, the intermediate node 206 receives a request from the terminal device 204 to receive communications via a lossless communication protocol, or the intermediate node may determine that communications with the terminal device 204 should utilize a lossless communication protocol (e.g., responsive to latency measurements such as round trip times being below a threshold, and/or responsive to packet loss or error rates being above a threshold, suggesting a short-range and low latency but unreliable network). In some embodiments, the intermediate node 206 converts/modifies the request to establish a lossless communication protocol connection to a request to establish a lossy communication protocol connection and transmits the request to establish the lossy communication protocol connection to the server 202. In some embodiments, the request from the terminal device 204 may comprise a synchronization request (TCP SYN) using a lossless communication protocol. The intermediate node 206 may convert the packet to a request to establish a lossy communication protocol connection by removing (e.g., decapsulating) a lossless communication protocol header and encapsulating (e.g., adding) a lossy communication protocol header. In some implementations, lossy protocols may be connectionless or stateless, and thus a connection request may be unnecessary; instead, the intermediary device may simply open a socket to listen for lossy protocol communications from the server device to be retransmitted via a lossy protocol connection to the terminal device 204.

The intermediate node 206 may maintain a synchronization counter for the lossy protocol connection. For example, in some implementations, lossy protocol communications may not utilize a synchronization counter. To convert such packets to a lossless protocol, in some implementations, the intermediary node 206 may maintain a synchronization counter and may increment the counter for each packet received via the lossy protocol connection and retransmitted via the lossless protocol connection (e.g., incrementing the counter once per packet, or once per bit, in various implementations). In some implementations, the intermediary node 206 may store synchronization values in non-standard fields of a protocol header, such as in an options field. In some embodiments in which both the lossless and lossy protocols utilize synchronization values, the intermediate node 206 determines a synchronization value of the header to be removed. In some embodiments, the intermediate node 206 includes the same synchronization value in the header to be encapsulated.

In some embodiments, the intermediate node 206 receives a packet from the server 202. The intermediate node 206 may be configured to determine whether the packet is a lossy communication protocol packet or a lossless communication protocol packet. The intermediate node 206 may be configured to determine whether the established link between the server 202 and the intermediate node 206 is using or should be using a different protocol than the established link between the intermediate node 206 and the terminal device 204. The intermediate node 206 may be configured to determine whether a destination (e.g., destination address) of the packet is a set top box such as the terminal device 204. The intermediate node 206 may be configured to determine whether the terminal device 204 requested a lossless communication protocol connection or should utilize such a connection (e.g., via measurements of latency and/or packet loss rates or other reliability indicators, as discussed above).

In some embodiments, in response to one or more of (a) the established link between the server 202 and the intermediate node 206 using a different protocol than the established link between the intermediate node 206 and the terminal device 204, (b) determining that the packet from the server 202 is in a lossy protocol, (c) the destination of the packet is the terminal device 204 or other terminal device, or (d) the terminal device requested a lossless communication protocol connection, the intermediate node 206 is configured to convert the lossy communication protocol packet to the lossless communication protocol packet. In some embodiments, the intermediate node 206 converts the lossy communication protocol packet to the lossless communication protocol packet by removing a lossy communication protocol header from the payload of the packet and encapsulating the payload in a lossless communication protocol header. In some embodiments, the intermediate node 206 maintains a synchronization counter of the lossless communication protocol packet. In some embodiments, the intermediate node 206 is configured to transmit the lossless communication protocol packet to the terminal device 204.

Figure 2B:
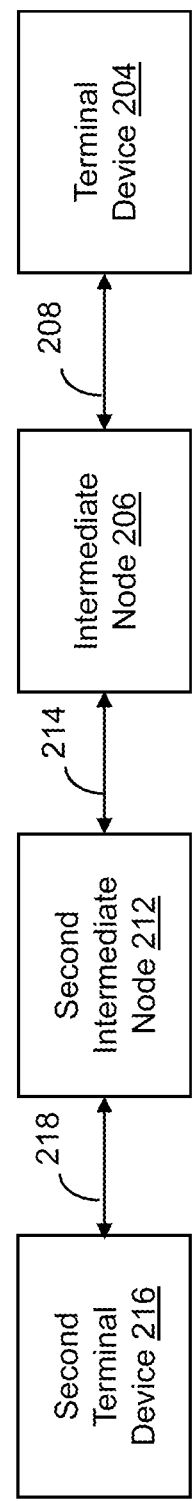
FIG. 2B is a block diagram depicting another communication system, in one or more embodiments.

Referring to FIG. 2B, illustrated is a block diagram depicting another communication system 200B, in one or more embodiments. In some embodiments, the communication system 200B is a communication system for remote desktop access, video game streaming, or similar real-time remote access to media. In some embodiments, the communication system 200B is similar to the communication system 200A except for the following differences. The communication system 200B includes a second intermediate node 212 and a second terminal node 216 in addition to the terminal device 204 and the intermediate node 206. In some embodiments, the intermediate node 206 is configured to be in communication with the second intermediate node 212 through a network 214. The network 214 may be similar to the network 210. The second intermediate node 212 may be configured to be in communication with the second terminal device 216 through a second network 218. The second network 218 may be similar to the network 208.

In some embodiments, the second terminal device 216 is configured to transmit a lossless communication protocol packet to the second intermediate node 212. In some embodiments, the second intermediate node 212 is configured to convert the lossless communication protocol packet to a lossy communication protocol packet and transmit the lossy communication protocol packet to the intermediate node 206. In some embodiments, the intermediate node 206 is configured to convert the lossy communication protocol packet to a second lossless communication protocol packet and transmit to the terminal device 204. In some embodiments, the terminal device 204 is configured to receive and decode the second lossless communication protocol packet. Accordingly, the implementation illustrated in FIG. 2B allows for a hybrid lossless-lossy-lossless communication path between the terminal devices, utilizing high-reliability protocols for short-distance hops with high loss rates, and low-latency protocols for long-distance hops with low loss rates.

Figure 3:
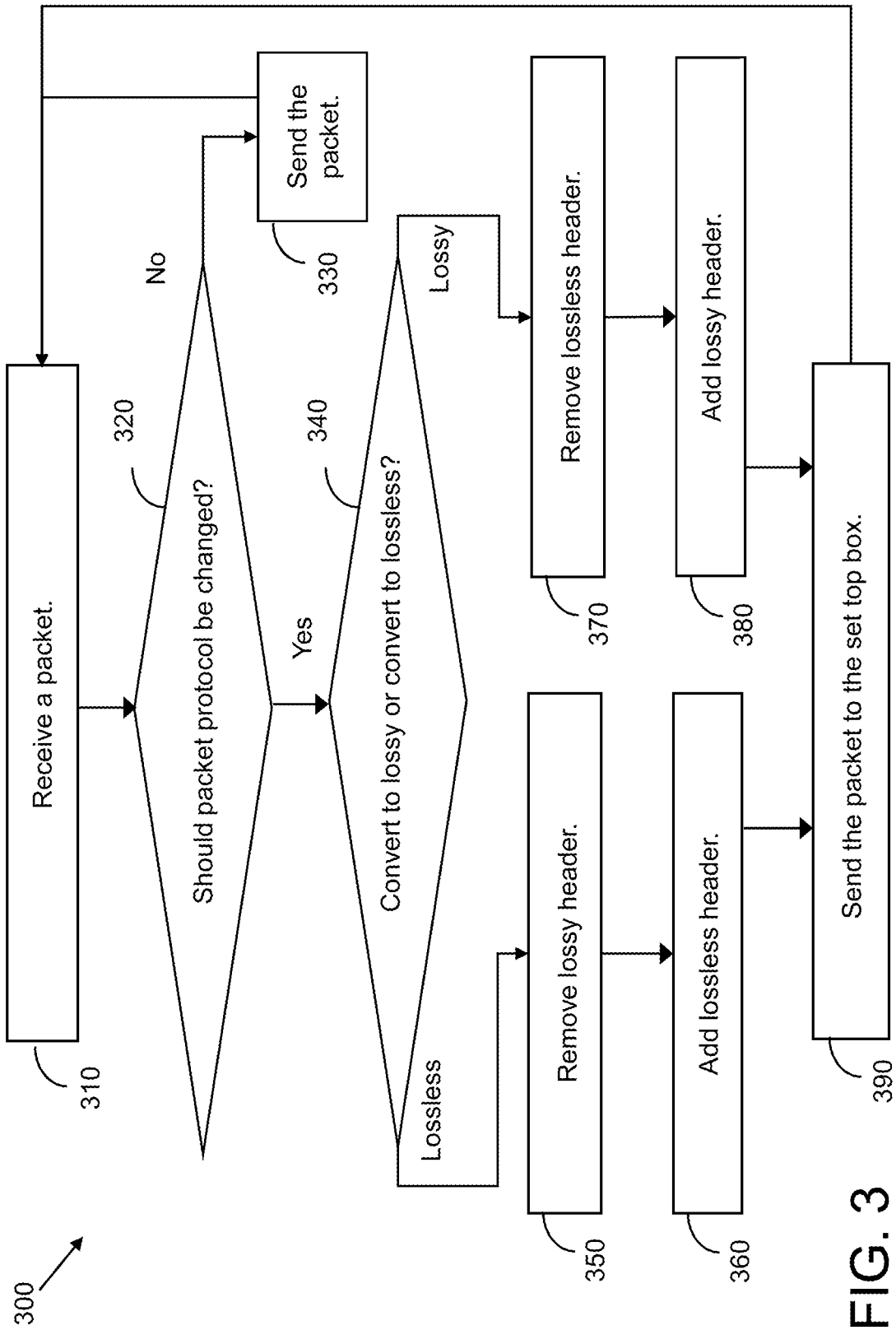
FIG. 3 is a flow chart depicting a method of converting packets, in one or more embodiments.

Referring to FIG. 3, illustrated is a flow chart depicting a method 300 of converting packets, in one or more embodiments. In some embodiments, the method 300 is performed by the intermediate node 206. In other embodiments, the method 300 is performed by other entities. In some embodiments, the method 300 includes more, fewer, or different steps than shown in FIG. 3.

The intermediate node receives a packet (at operation 310). The intermediate node determines whether a packet protocol of the packet should be changed (at operation 320). In some embodiments, the intermediate node determines that a packet protocol should be changed if one or more of the following is satisfied: (a) the packet is from one of a server or a terminal device with a destination of the other of the server or the terminal device, (b) the packet is from the terminal device and is a lossless communication protocol packet, (c) the packet is from the server and is a lossy communication protocol packet, or (d) a sending device (e.g., one of the server or the terminal device) requests the packet protocol to be changed. In some implementations, the packet may be a packet to establish a connection (e.g., a SYN packet or a connection request packet), and the intermediate node may determine whether the protocol should be changed responsive to a first connection to the terminal device having different characteristics than a second connection to the server (e.g., a latency of the terminal device-intermediate node connection being less than a threshold (e.g., indicating a short hop) and/or a packet loss rate being greater than a threshold (e.g., indicating an unreliable link such as WiFi); and/or a latency of the intermediate node-server connection having a latency above a threshold (e.g., indicating a long hop or the Internet) and/or a packet loss rate being lower than a threshold (e.g., indicating a reliable or wired link)). Upon determining that each physical connection has different characteristics, the intermediate node may determine that communications between the two endpoints should have their protocols changed when traversing the intermediate node. In some embodiments, the packet may be a part of a transport stream (TS) such as a moving picture export groups (MPEG) TS.

In response to determining that the packet protocol should not be changed, the intermediate node transmits the packet to the destination (at operation 330). In response to operation 330, the method 300 returns to the operation 310. In response to determining that the packet protocol should be changed, the intermediate node determines whether to convert the packet to a lossy communication protocol packet or a lossless communication protocol packet (at operation 340). In response to determining that the packet protocol should be converted to a lossy communication protocol packet, the intermediate node removes the lossless header (at operation 350) to generate a payload. The intermediate node encapsulates the payload with a lossy header to generate the lossy communication protocol packet (at operation 360). In some embodiments, the intermediate node maintains a synchronization counter of the lossy communication protocol packet.

In response to determining that the packet protocol should be converted to a lossless communication protocol packet, the intermediate node removes the lossy header (at operation 370) to generate a payload. The intermediate node encapsulates the payload with a lossless header to generate the lossless communication protocol packet (at operation 380). In some embodiments, the intermediate node maintains a synchronization counter of the lossless communication protocol packet. The intermediate node transmits the packet (at operation 390). In response to operation 390, the method 300 returns to the operation 310.

Figure 4:
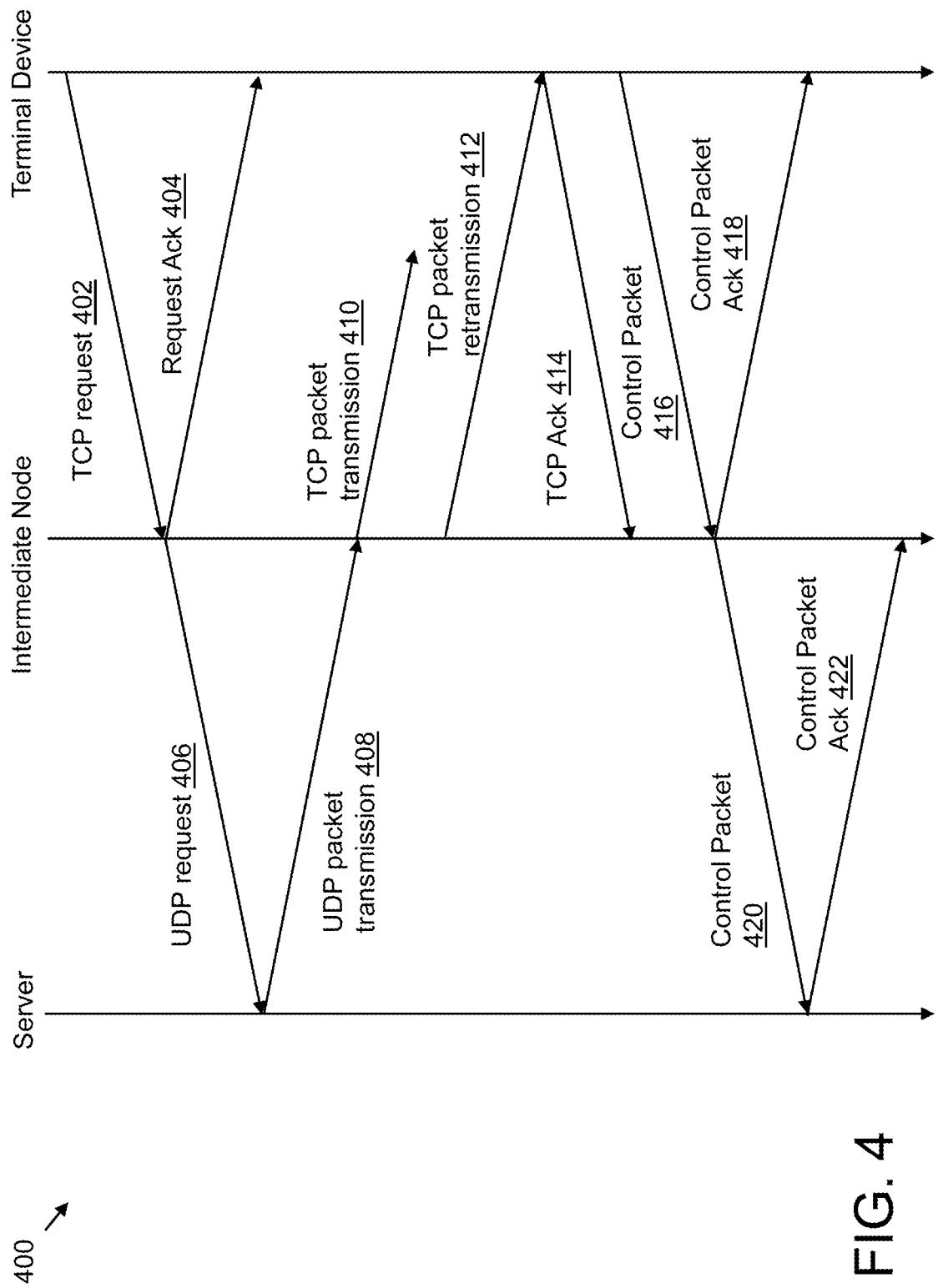
FIG. 4 is a swim lane diagram of the communication system, in one or more embodiments.

Referring to FIG. 4, illustrated is a swim lane diagram 400 of the communication system 200A, in one or more embodiments. At operation 402, the terminal device 204 transmit a request to establish a lossless communication protocol connection to the intermediate node 206. In some embodiments, the intermediate node 206 may convert the request to establish the lossless communication protocol connection to a request to establish a lossy communication protocol connection. For example, the intermediate node 206 modifies a payload of the request packet or replaces the payload with a second payload. In some embodiments, the request to establish the lossless communication protocol connection is a lossless communication protocol packet. In some embodiments, the intermediate node 206 converts the request from the lossless communication protocol packet to a lossy communication protocol packet by removing the lossless communication protocol header and encapsulating a lossless communication protocol header. At operation 404, the intermediate node 206 transmits an acknowledgment of the request to the terminal device 204. At operation 406, the intermediate node 206 transmits the request to establish the lossy communication protocol connection to the server 202.

At operation 408, the server 202 transmits a lossy communication protocol packet to the intermediate node 206. In some embodiments, the intermediate node 206 converts the lossy communication protocol packet to a lossless communication protocol packet by removing a lossy header and encapsulating a lossless header. At operation 410, the intermediate node 206 transmits the lossless communication protocol packet to the terminal device 204. In some embodiments, the packet is dropped (e.g., due to losses on the link, interference, etc.). In some embodiments, at operation 412, the intermediate node 206 retransmits the lossless communication protocol packet to the terminal device 204. At operation 414, the terminal device 204 transmits an acknowledgement of the lossless communication protocol packet. The acknowledgement need not be forwarded to the server, since the server-intermediate node link does not require acknowledgements. Similarly, although not illustrated, because the server-intermediate node link does not require acknowledgements, the server may continue sending additional packets after the transmission 408 without pause. The intermediate node 206 may continue converting and transmitting these packets to the terminal device 204 (e.g., including buffering the packets for transmission between retransmissions 412, etc.).

In some instances, some communications via the lossy link may be acknowledged, such as control packets or requests. For example, in some embodiments, at operation 416, the terminal device 204 transmits a control packet to the intermediate node 206 or the server 202. In some embodiments, at operation 418, the intermediate node 206 transmits an acknowledgement of the control packet to the terminal device 204. In some embodiments, the control packet is a lossless communication protocol packet. In some embodiments, the intermediate node 206 converts the control packet from the lossless communication protocol packet to a lossy communication protocol packet. In some embodiments, at operation 420, the intermediate node 206 transmits the lossy control packet to the server 202. In some embodiments, at operation 422, the server 202 transmits an acknowledgement of the control packet to the intermediate node 206 or the terminal device 204. In some implementations, the control packet acknowledgement 422 from the server need not be converted and transmitted to the terminal device 204 to avoid confusion with acknowledgement 418. In other implementations, control packet acknowledgement 418 may be held or delayed until receipt of control packet acknowledgement 422 by the intermediate node. While this may add latency (e.g., requiring the full round trip time), it may be acceptable for control packets.

It should be noted that certain passages of this disclosure can reference terms such as "first" and "second" in connection with subsets of transmit spatial streams, sounding frames, response, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities that can operate within a system or environment. It should be understood that the systems described above can provide multiple ones of any or each of those components and these components can be provided on either a stand-alone machine or, in some embodiments, on multiple machines in a distributed system.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A communication system comprising:
an intermediate node communicatively located between a server and a terminal device and configured to:
provide a wireless access point for communication between the server and the terminal device;
receive a lossy communication protocol packet from the server;
identify a value of a characteristic of a connection between the server and the terminal device;
responsive to the identified value of the characteristic of the connection satisfying a threshold, convert the lossy communication protocol packet to a lossless communication protocol packet; and
transmit, via the connection, the converted lossless communication protocol packet to the terminal device.

2. The communication system of claim 1, wherein the intermediate node is configured to remove a lossy communication protocol header from the lossy communication protocol packet to generate a payload.

3. The communication system of claim 2, wherein the intermediate node is configured to encapsulate the payload with a lossless communication protocol header to generate the lossless communication protocol packet.

4. The communication system of claim 1, the intermediate node is configured to maintain a synchronization counter of the lossless communication protocol packet.

5. The communication system of claim 1, wherein the intermediate node is configured to convert the lossy communication protocol packet to the lossless communication protocol packet in response to determining that the server sends the lossy communication protocol packet and that the lossy communication protocol packet is destined for the terminal device.

6. The communication system of claim 1, wherein the intermediate node receives an acknowledgement for sending the lossless communication protocol packet from the terminal device.

7. The communication system of claim 1, wherein the intermediate node is configured to retransmit the lossless communication protocol packet to the terminal device in response to not receiving an acknowledgement within a predetermined time period from the terminal device.

8. The communication system of claim 1, wherein the intermediate node receives a control packet from the terminal device.

9. The communication system of claim 8, wherein the intermediate node transmits an acknowledgement to the terminal device in response to receiving a control packet from the terminal device.

10. The communication system of claim 1, wherein a moving picture export groups (MPEG) transport stream (TS) includes the lossy communication protocol packet.

11. A method by an intermediate node of a communication system, the method comprising:
providing a wireless access point for communication between a server and a terminal device, the intermediate node communicatively located between the server and the terminal device;
receiving a lossy communication protocol packet from the server;
identifying a value of a characteristic of a connection between the server and the terminal device;
responsive to the identified value of the characteristic of the connection satisfying a threshold, converting the lossy communication protocol packet to a lossless communication protocol packet; and
transmitting, via the connection, the lossless communication protocol packet to the terminal device.

12. The method of claim 11, further comprising removing a lossy communication protocol header from the lossy communication protocol packet to generate a payload.

13. The method of claim 12, further comprising encapsulating the payload with a lossless communication protocol header to generate the lossless communication protocol packet.

14. The method of claim 11, further comprising maintaining a synchronization counter of the lossless communication protocol packet.

15. The method of claim 11, further comprising converting the lossy communication protocol packet to the lossless communication protocol packet in response to determining that the server sends the lossy communication protocol packet and that the lossy communication protocol packet is destined for the terminal device.

16. The method of claim 11, further comprising receiving an acknowledgement for sending the lossless communication protocol packet from the terminal device.

17. The method of claim 11, further comprising retransmitting the lossless communication protocol packet to the terminal device in response to not receiving an acknowledgement within a predetermined time period from the terminal device.

18. The method of claim 11, wherein a moving picture export groups (MPEG) transport stream (TS) includes the lossy communication protocol packet.

19. The system of claim 1, wherein the lossy communication protocol packet comprises a user datagram protocol (UDP) packet the lossless communication protocol packet comprises a transmission control protocol (TCP) packet.

20. The system of claim 1, wherein the intermediate node is configured to determine the value of the characteristic of the connection satisfies the threshold by determining a latency of the connection exceeds or is less than the threshold.

21. The system of claim 1, wherein the intermediate node is configured to determine the value of the characteristic of the connection satisfies the threshold by determining a rate of packet loss of the connection exceeds or is less than the threshold.

* * * * *